(12) United States Patent
Li

(10) Patent No.: US 6,421,193 B1
(45) Date of Patent: Jul. 16, 2002

(54) METHOD AND APPARATUS FOR DETECTING, LOGGING AND RECOVERING FROM ERRORS CAUSED BY MULTIPLE THERMAL ASPERITIES IN A SECTOR

(75) Inventor: Robert Yuan-Shih Li, Fremont, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/237,398

(22) Filed: Jan. 26, 1999

(51) Int. Cl.$^7$ ................................. G11B 5/02
(52) U.S. Cl. ........................... 360/25; 360/53
(58) Field of Search ..................... 360/25, 53

(56) References Cited

U.S. PATENT DOCUMENTS

| | | | | | |
|---|---|---|---|---|---|
| 5,051,998 A | * | 9/1991 | Murai et al. | ................ | 714/762 |
| 5,450,251 A | * | 9/1995 | Kitagawa | .................... | 360/48 |
| 5,844,920 A | * | 12/1998 | Zook et al. | .............. | 371/40.14 |
| 5,898,535 A | * | 4/1999 | Kawai | ..................... | 360/77.02 |
| 6,018,428 A | * | 1/2000 | Okamura | ..................... | 360/25 |
| 6,038,091 A | * | 3/2000 | Reed et al. | ................... | 360/46 |
| 6,084,734 A | * | 7/2000 | Southerland et al. | ......... | 360/53 |
| 6,147,827 A | * | 11/2000 | Southerland et al. | ......... | 360/53 |

* cited by examiner

Primary Examiner—David Hudspeth
Assistant Examiner—Dan I. Davidson
(74) Attorney, Agent, or Firm—Altera Law Group, LLC

(57) ABSTRACT

A method and apparatus for compensating for multiple thermal asperity events in a sector. The present invention provides for the detection, recording and recovery from errors caused by multiple thermal asperities occurring in a single sector. The method includes detecting thermal asperity events in a sector, setting a flag indicating each occurrence of a thermal asperity event in the sector, maintaining a count of the detected thermal asperity events in the sector and recording a byte location for each of the detected thermal asperity events in the sector. The method further includes performing a data recovery procedure in response to the detected thermal asperity events. The data recovery procedure is performed using the flag settings and a location corresponding to the detected thermal asperity events. The data recovery procedure is performed using the count of the detected thermal asperity events. The setting of a flag includes setting a bit in a register. The setting of a bit indicates a start byte location for a thermal asperity event. The maintaining a count of the detected thermal asperity events in the sector includes the setting of a bit in the register for each detected thermal asperity event, the count being equal to a number of bits set in the register. The recording a location for each of the detected thermal asperity events in the sector includes setting a bit in a register, the bit position being associated with the location of the asperity event. The maintaining a count of the detected thermal asperity events in the sector includes setting a bit in a register for each detected thermal asperity events, the count being equal to a number of bits set in the register.

32 Claims, 8 Drawing Sheets

METHOD AND APPARATUS FOR DETECTING, LOGGING AND RECOVERING FROM ERRORS CAUSED BY MULTIPLE THERMAL ASPERITIES IN A SECTOR

BACKGROUND OF THE INVENTION

1. Field of the Invention.

This invention relates in general to storage systems, and more particularly to a method and apparatus for compensating for multiple thermal asperity events in a sector.

2. Description of Related Art.

Computers often include auxiliary memory storage units having media for data storage and retrieval. Disk drives are the most common example of such auxiliary memory storage units. Disk drives typically include stacked, commonly rotated rigid magnetic disk for magnetically recording data thereon. Data is recorded in concentric, radially spaced data information tracks arrayed on the surfaces of the disks. Transducer heads driven in a path toward and away from the drive axis write data to and read data from the disks. A slider supports one or more magnetic heads. The slider is lightly biased to cause the heads to move toward the recording surface when the disk is stationary; but as the disk is brought up to operating speed, an air bearing is generated which moves each slider and hence the heads away from the recording surface toward a preselected flying height. Achievement of a higher data density on magnetic disks has imposed increasingly narrow transducing gaps.

Magneto-resistive (MR) heads have substantially improved the areal bit densities of hard disk drives. However, this improvement is not without complications. More specifically, MR heads have been associated with an increased sensitivity to thermal asperities. Contact with debris or media bumps can heat up MR heads, causing disturbances in the read-back signal. Near contacts with mounts on the media can cool down MR heads, causing disturbances in the read-back signal. Unless properly compensated for, these disturbances can produce unrecoverable errors.

A heating thermal asperity occurs when a head contacts a disk asperity or collides with a foreign particle. A cooling thermal asperity occurs when a head has a near contact with a disk asperity which causes a heat transfer out of the MR element. While thermal asperities can occur with inductive heads, they are a more serious problem in MR heads. For example, thin-film heads generate current based on changes in the magnetic flux. The inductance value is not significantly affected by temperature, and the change in series resistance is a second-order effect.

In contrast, the fundamental read-back mechanism of an MR head is inherently sensitive to changes in temperature. MR heads are resistive sensors, which generate resistive variations, and corresponding voltage or current variations, in response to changes in the magnetic field of the media. MR head stripes are made of permalloy. Like most metals, the resistivity of permalloy is proportional to temperature. Unfortunately, this change in resistance resulting from a thermal asperity has similar characteristics to the read-back signal the sensor is designed to detect.

Asperity problems are further compounded by efforts to push areal densities higher and to maintain adequate signal-to-noise ratios. Such trends have led to lower flying heights, creating additional problems for disk-drive manufacturers. This is true even though significant improvements have been made in media smoothness and contamination control.

Many approaches have been developed for detecting and compensating for thermal asperity transients. In fact, these thermal asperity techniques have made single thermal asperity occurrence per sector in a hard disk drive with MR heads a non-event. However, up to now, thermal asperity handling techniques have not been able to fully compensate for multiple thermal asperity events occurring in a single sector, and hard error events are still a common incident.

It can be seen that there is a need for a method and apparatus that compensates for multiple thermal asperity events occurring in a sector.

SUMMARY OF THE INVENTION

To overcome the limitations in the prior art described above, and to overcome other limitations that will become apparent upon reading and understanding the present specification, the present invention discloses a method and apparatus for compensating for multiple thermal asperity events in a sector.

The present invention solves the above-described problems by providing for the detection, logging and recovery from errors caused by multiple thermal asperities occurring in a single sector.

A method in accordance with the principles of the present invention includes detecting thermal asperity events in a sector, setting a flag indicating occurrence of a thermal asperity event in the sector, maintaining a count of the detected thermal asperity events in the sector and recording a location for the detected thermal asperity event in the sector.

Other embodiments of a system in accordance with the principles of the invention may include alternative or optional additional aspects. One such aspect of the present invention is that the method further includes performing a data recovery procedure in response to the detected thermal asperity event.

Another aspect of the present invention is that the data recovery procedure is performed using the flag settings and a location corresponding to the detected thermal asperity events.

Another aspect of the present invention is that the data recovery procedure is further performed using the count of the detected thermal asperity events.

Another aspect of the present invention is that the setting of a flag includes setting a bit in a register.

Another aspect of the present invention is that the recording further comprises setting a selected bit in a register, the selected bit's position in the register being determined by the location of the detected thermal asperity event.

Another aspect of the present invention is that the maintaining a count of the detected thermal asperity events in the sector includes the setting of a bit in the register for each detected thermal asperity event, the count being equal to a number of bits set in the register.

Another aspect of the present invention is that the recording of the location for the detected thermal asperity event in the sector includes setting a bit in a register, the bit being associated with the asperity event.

Another aspect of the present invention is that the maintaining a count of the detected thermal asperity events in the sector includes setting a bit in a register for each detected thermal asperity events, the count being equal to a number of bits set in the register.

In another embodiment, the present invention includes a controller for processing multiple asperity events in a sector of a storage device, the controller including a processor for receiving indications of thermal asperity events in a sector and a register for storing an indication representing each occurrence of a thermal asperity event in the sector.

In another embodiment, the present invention includes a disk drive, the disk drive including a storage medium including sectors of recorded data, a motor for moving the storage medium relative to a magneto-resistive head and a control unit, the control unit controlling the motor and the position of the magnetic head relative to the data storage medium and a controller for processing multiple asperity events in a sector of the storage medium, the controller further including a processor for receiving indications of thermal asperity events in a sector and a register for storing an indication representing each occurrence of a thermal asperity event in the sector.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for compensating for multiple thermal asperity events in a sector. The present invention provides for the detection, recording and recovery from errors caused by multiple thermal asperities occurring in a single sector.

Figure 1:
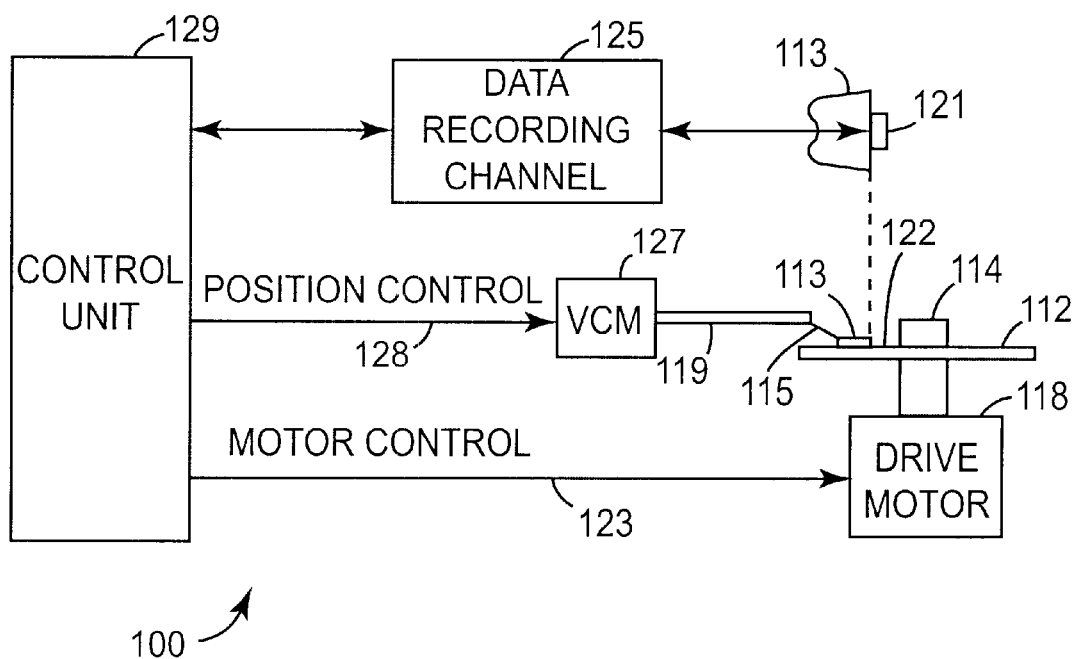
FIG. 1 illustrates a disk drive embodying the present invention.

FIG. 1 illustrates a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on disk 112.

At least one slider 113 is positioned on the disk 112, each slider 113 supporting one or more magnetic read/write heads 121 where the head 121 incorporates the MR sensor of the present invention. As the disks rotate, slider 113 is moved radically in and out over disk surface 122 so that heads 121 may access different portions of the disk where desired data is recorded. Each slider 113 is attached to an actuator arm 119 by means of a suspension 115. The suspension 115 provides a slight spring force which biases slider 113 against the disk surface 122. Each actuator arm 119 is attached to an actuator means 127. The actuator means as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 5o the desired data track on disk 112. Read and write signals are communicated to and from read/write heads 121 by means of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
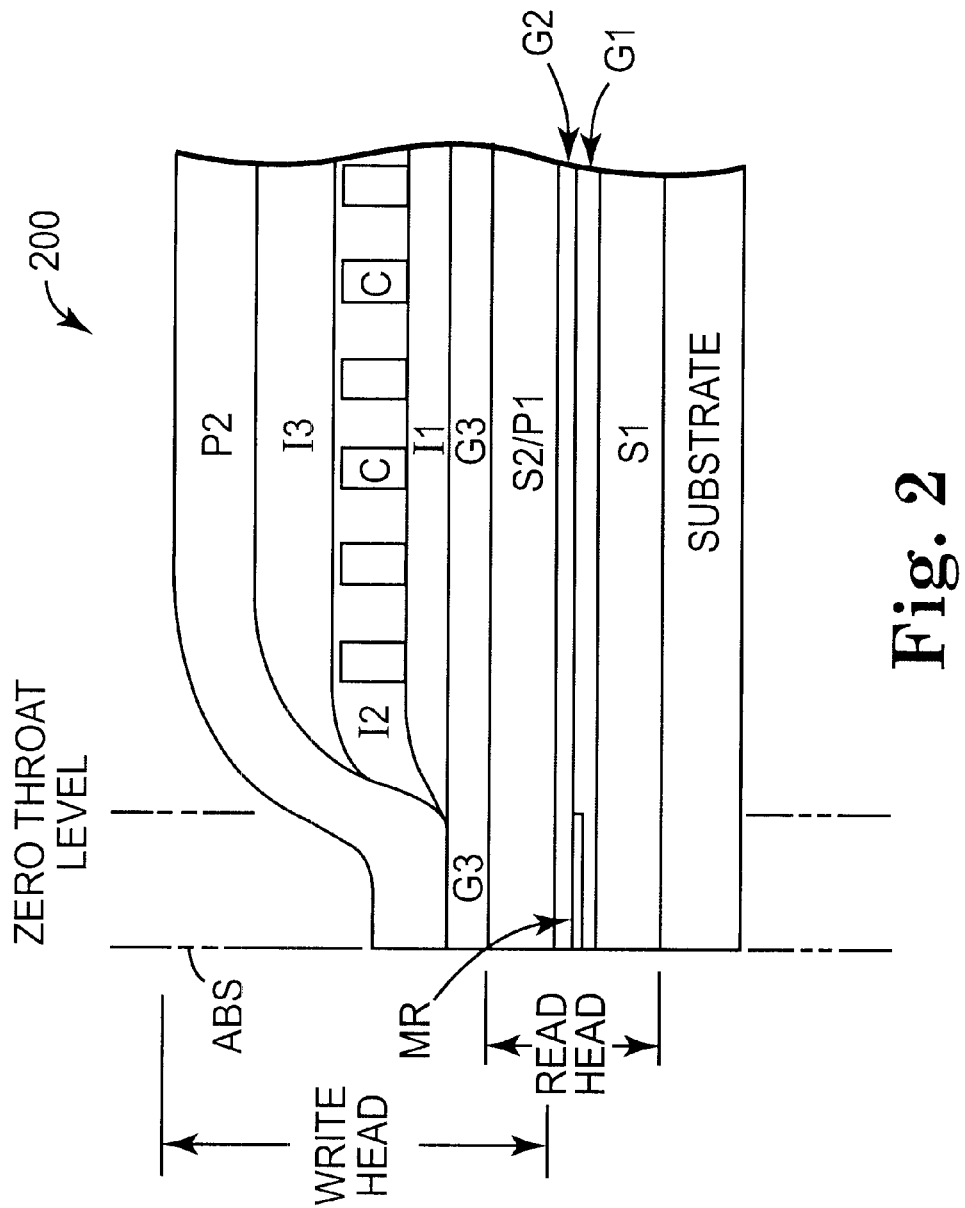
FIG. 2 is a side cross-sectional schematic illustration of the merged MR head.

FIG. 2 is a side cross-sectional schematic illustration of the merged MR head 200. The merged MR head 200 includes a read head portion and a write head portion which are lapped to an air beating surface (ABS), the air bearing surface being spaced from the surface of the rotating disk by the air bearing as discussed hereinabove. The read head portion includes an MR sensor which is sandwiched between first and second gaps layers G1 and G2 which, in turn, are sandwiched between first and second shield layers S1 and S2. The write head portion includes a coil layer C and insulation layer 12 which are sandwiched between insulation layers 11 and 13 which in turn are sandwiched between first and second pole pieces P1 and P2. A gap layer G3 is sandwiched between the first and second pole pieces at their pole tips adjacent the ABS for providing a magnetic gap. When signal current is conducted through the coil layer C, signal flux is induced into the first and second pole layers P1 and P2 causing signal fringe flux across the pole tips of the pole pieces at the ABS. This signal fringe flux is induced into circular tracks on the rotating disk 116, shown in FIG. 1, during a write operation. During a read operation, recorded magnetic flux signals on the rotating disk are induced into the MR sensor of the read head causing a change in the resistance of the MR sensor which can be sensed by a change in potential across the MR sensor responsive to a sense current (not shown) conducted through the MR sensor. These changes in potential are processed by the drive electronics not shown. The combined head illustrated in FIG. 2 is a merged MR head in which the second shield layer S2 is employed as a first pole piece P1 for the combined head. In a piggyback head (not shown) the second shield layer S2 and the first pole piece P1 are separate layers.

Figure 3:
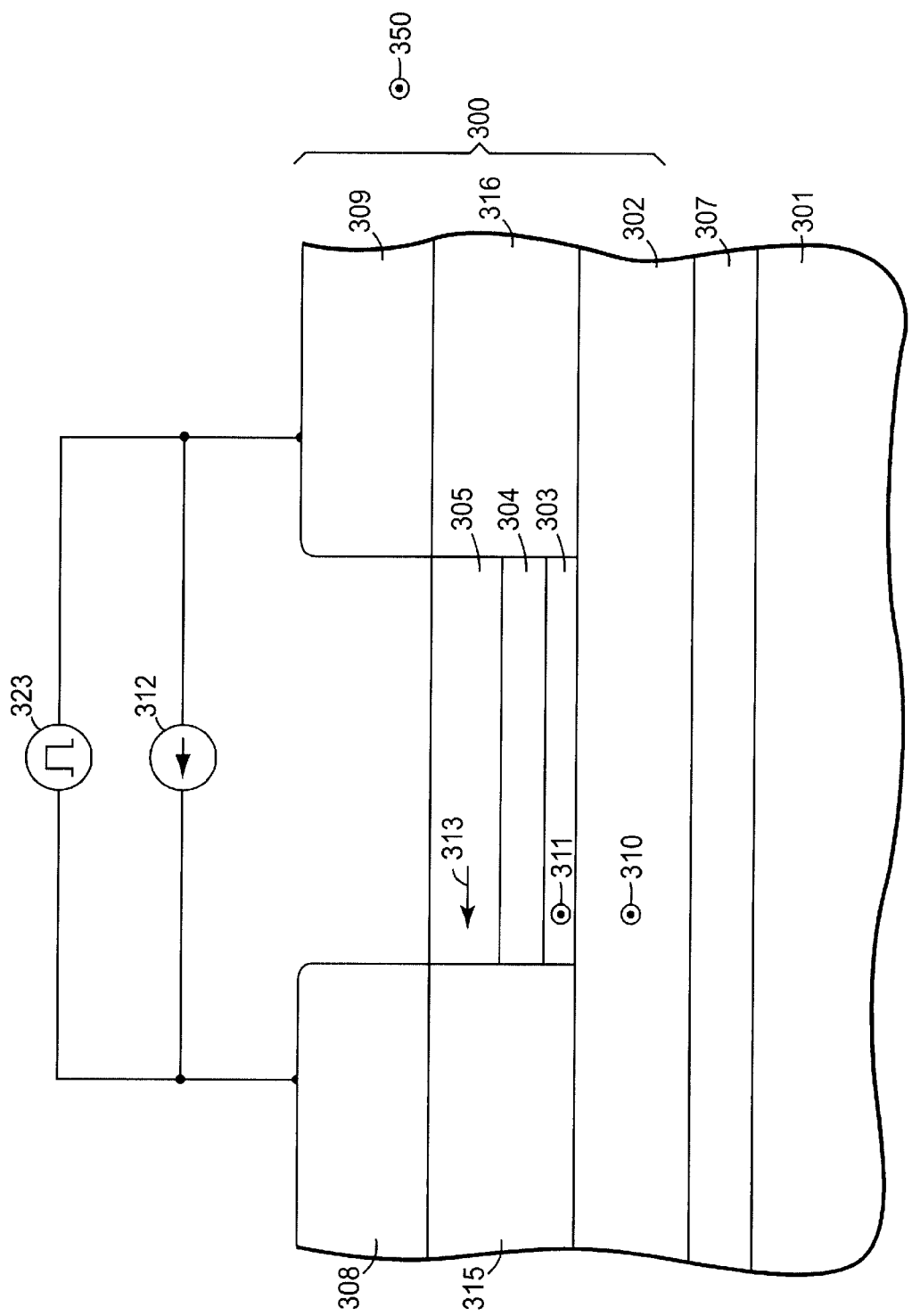
FIG. 3 depicts an example of a spin valve sensor upon which the invention may be practiced.

FIG. 2 illustrates the overall physical arrangement of the layers used in forming a merged MR head 200. However, FIG. 2 does not show the leads to the MR sensor. As mentioned above, the leads required significantly larger area than the area required of the MR sensor. Furthermore, the gap coverage at the edge of the leads is poor and potential for shield-to-lead shorts for high density (thin gap) heads increase significantly. However, since most of the shorts are from the leads to the shields, the leads should be designed to prevent shield-to-lead shorts. FIG. 3 illustrates, with respect to GMR heads, how the leads are attached to the sensors. FIG. 3 depicts an example of a spin valve sensor 300 upon which the invention may be practiced. The view of FIG. 3 depicts a plan view of the air bearing surface of a substrate 301 containing the spin valve 300. The substrate's air bearing surface normally rides upon a cushion of air, which separates it from a magnetic data storage medium such as a disk or tape.

The sensor 300 includes a plurality of substantially parallel layers including an 302, a ferromagnetic pinned layer 303, a conductive layer 304, and a ferromagnetic free layer 305. The sensor 300 also includes hard bias layers 315–316, the operation of which is discussed in greater detail below. The sensor 300 is deposited upon an insulator 307, which lies atop the substrate 301. Adjacent layers preferably lie in direct atomic contact with each other.

The antiferromagnetic layer 302 comprises a type and thickness of antiferromagnetic substance suitable for use as a pinned layer in spin valves, e.g., a 400 Å layer of NiO. The ferromagnetic pinned layer 303 comprises a type and thickness of ferromagnetic substance suitable for use in spin valves, e.g., about 10–40 Å of Co. The conductor layer 304 comprises a type and thickness of conductive substance suitable for use in spin valves, e.g., about 20–30 Å of Cu. The ferromagnetic free layer 305 comprises a type and thickness of ferromagnetic substance suitable for use as a free layer in spin valves, e.g., about 30–150 Å of NiFe. The hard bias layers 315–316 provide the free layer 305 with a desired quiescent: magnetization. The hard bias layers 315–316 preferably comprise a magnetic material with high coercivity, such as CoPtCr.

Despite the foregoing detailed description of the sensor 300, the present invention may be applied using many different sensor arrangements in addition to this example. For example, ordinarily skilled having the benefit of this disclosure will recognize various alternatives to the specific materials and thickness described above.

The sensor 300 exhibits a predefined magnetization. Magnetization of the sensor 300, including the ferromagnetic layers 303/305 and the antiferromagnetic layer 302, is performed in accordance with the invention. The sensor 300 may be magnetized. prior to initial operation, such as during the fabrication or assembly processes. Or, the sensor 300 may be magnetized after some period of operating the sensor 300, where the sensor 300 loses its magnetic orientation due to a traumatic high temperature event such as electrostatic discharge. A process for magnetization of the sensor 300 is discussed in greater detail below.

Whether magnetized before or after initial operation of the sensor 300, the magnetized components of the sensor 300 are ultimately given the same magnetic configuration. In particular, the antiferromagnetic layer 302 has a magnetic orientation in a direction 310. For ease of explanation, conventional directional shorthand is used herein, where a circled dot indicates a direction coming out of the page (like an arrow's head), and a circled x indicates a direction going into the page (like an arrow's tail). The neighboring ferromagnetic pinned layer 303 has a magnetic moment pinned in a parallel direction 311, due to antiferromagnetic exchange coupling between the layers 302–303.

Unlike the pinned layer 303, the free layer 305 has a magnetic moment that freely responds to external magnetic fields, such as those from a magnetic storage medium. The free layer 305 responds to an external magnetic field by changing its magnetic moment, which in turn changes the resistance of the spin valve 300. In the absence of any other magnetic fields, the free layer 305 orients itself in a direction 313, which is oriented 90° to the directions 310–311. This quiescent magnetization direction is due to biasing of the free layer 305 by the hard bias layers 315–316.

The sensor 300 may also include various accessories to direct electrical current and magnetic fields through the sensor 300. A small but constant sense current, for example, is directed through the sensor 300 to provide a source of scattering electrons for operation of the sensor 300 according to the GMR effect. At different times, a relatively large current pulse or waveform is directed through the sensor 300 to establish the magnetization direction of the sensor 300. FIG. 3 also depicts the sensor 300 in relation to the various features that help direct current through the sensor 300.

The sensor 300 is attached to a pair of complementary leads 308–309 to facilitate electrical connection to a sense current source 312. The leads 308–309 also facilitate electrical connection to a pulse current source 323. The leads 308–309 preferably comprise 500 Å of Ta with a 50 Å underlayer of Cr, or another suitable thickness and type of conductive material. The attachment of leads to magnetoresistive sensors and spin valves is a well known technique, familiar to those of ordinary skill in the art.

A technique for establishing a predetermined magnetic orientation of spin valve sensor or GMR head has been developed and is disclosed in copending, and commonly owned U.S. patent application Ser. No. 08/855,141, herein incorporated by reference. This technique will be explained with reference to FIG. 3.

Via the leads 308–309, the pulse current source 323 directs an electrical pulse current through the layers 303–305. Chiefly, the pulse current heats the antiferromagnetic layer 302 past its blocking temperature. For an additional measure of magnetization biasing, the pulse current source 323 may be configured to provide pulse current in an appropriate direction to enhance biasing of the antiferromagnetic layer 302 in the direction 310. The pulse current flows from the lead 309 to the lead 308. To satisfy the foregoing purposes, the current source 323 comprises a suitable device to provide a current pulse of sufficient amplitude and duration to bring the antiferromagnetic layer 302 past its blocking temperature, thereby freeing the magnetic orientations of this layer as well as the associated ferromagnetic pinned layer 303.

In addition to heat, the current pulse also provides a magnetic field that magnetically orients the antiferromagnetic layer 302 in accordance with the well known right-hand rule of electromagnetics. The pulse current lasts sufficiently long to both remove any magnetic orientation of the antiferromagnetic layer and also to reorient the layers in accordance with the magnetic field created by the flowing current.

The magnetic orientation of the antiferromagnetic layer 302 has the effect of pinning the magnetization directions of the ferromagnetic pinned layer 303. This occurs because of the strong exchange coupling between the antiferromagnet-ferromagnet pair 302/303. More particularly, the antiferromagnetic layer 302 pins the ferromagnetic pinned layer 303 in a direction parallel to its own direction. The pulse current source 323 then applies a bias current to orient the magnetic field of ferromagnet layer 305.

As suggest above, there are may ways to detect and compensate for thermal asperity events. However, the detection and compensation techniques may be broadly characterized as preamplifier and read channel techniques.

Figure 4:
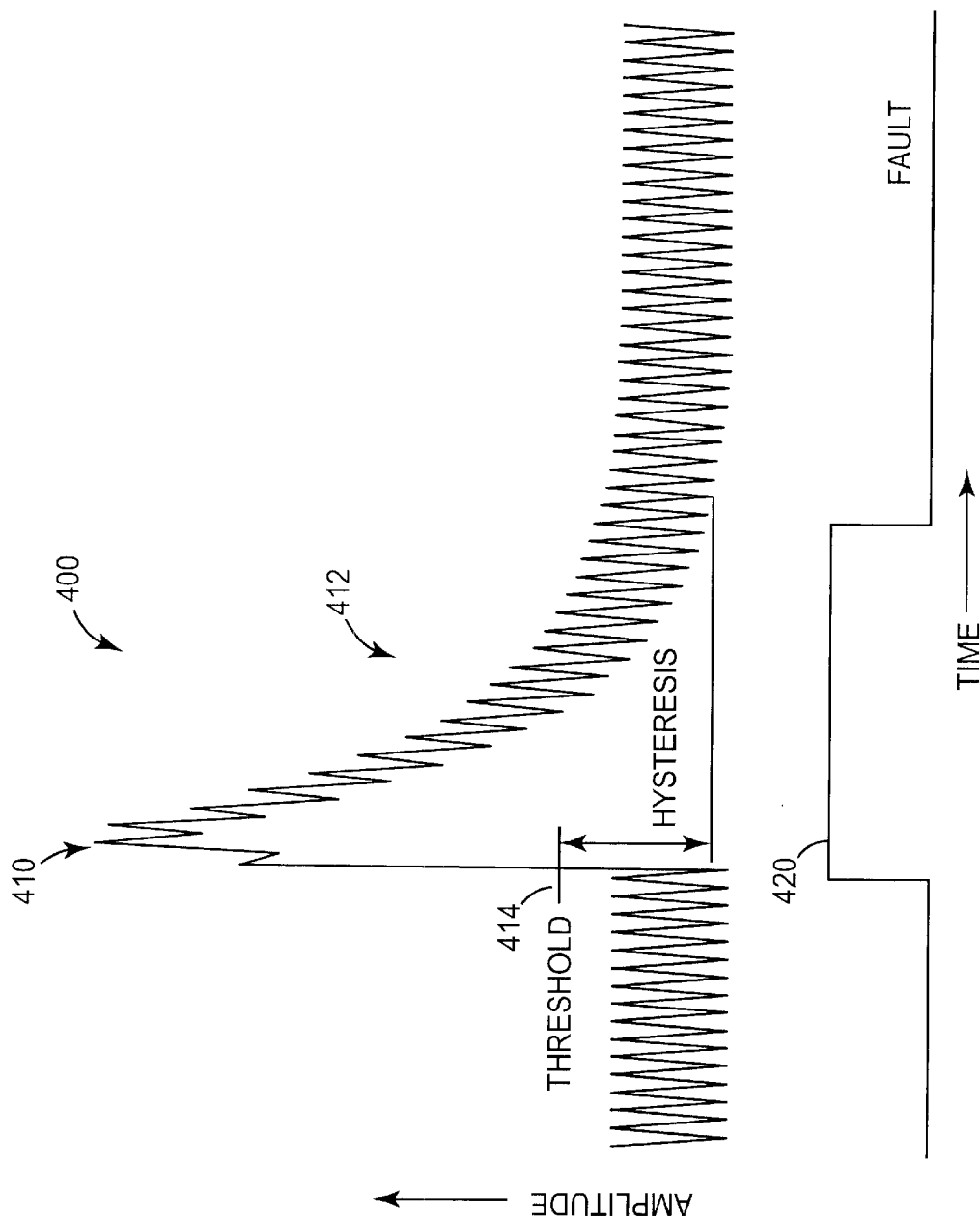
FIG. 4 illustrates the threshold detection of a heating thermal asperity event.

FIG. 4 illustrates the threshold detection of a heating thermal asperity event 400. A thermal asperity 410 causes a rapid change in the resistance of a MR head followed by a slow decay 412. Detection of the signal excursion above a threshold level 414 produces a "fault" pulse 420 that can be used for compensation. Contact with a disk asperity causes a rapid rise in head temperature. The flash temperature of an MR element may be 50° C. to 125° C. higher than the nominal temperature. As a result, resistance can change from 1% to 2.5%. Since the typical resistance variation during readback is around 0.5%, the thermal asperity event can result in a signal transient with an amplitude that is two to five times the normal signal amplitude.

Figure 5:
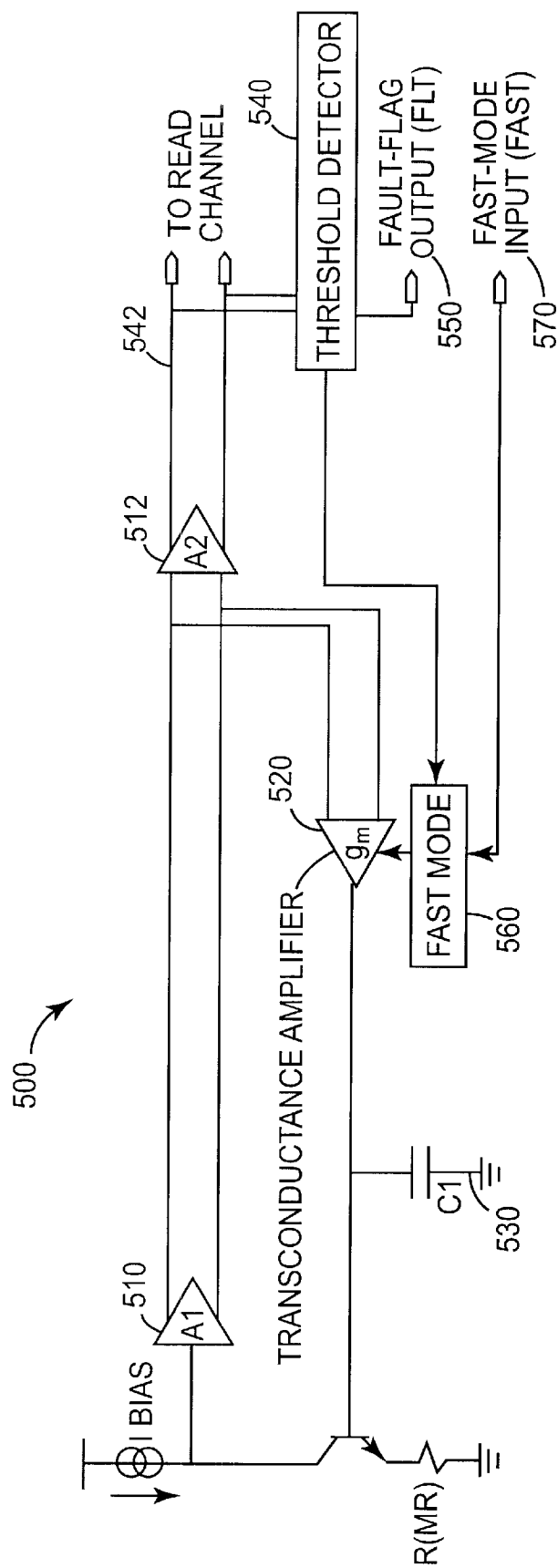
FIG. 5 illustrates a fast mode asperity compensation circuit in a current sensing preamplifier.

FIG. 5 illustrates a fast mode asperity compensation circuit in a current sensing preamplifier 500. The fast mode asperity compensation circuit 500 of FIG. 5 includes a first-gain stage reader 510, a second-gain stage reader 512 and a transconductance feedback amplifier 520. The transconductance feedback amplifier 520 maintains the DC balance of the preamplifier 500. As a result of feedback, the input stage 510 has a low-frequency pole associated with the transconductance feedback amplifier 520 and capacitor C1 530. This pole removes low-frequency components, while allowing the signal to pass through to the second stage 512. The pole frequency is defined by:

$$F_p = A_v \cdot g_m / 2pC1$$

where $A_v$ is the first-stage gain 510, $g_m$ is the transconductance of the feedback amplifier 520 and C1 is the value of the feedback loop compensation capacitor 530.

A threshold detector 540 monitors the preamplifier output 542 to respond to thermal asperity events. If the thermal asperity threshold is exceeded, a fault flag 550 is generated. Under normal conditions, the baseline is restored at a rate governed by the normal low-corner frequency. However, the threshold detector 540 may, optionally, enable a "fast mode" 560 wherein the low-corner frequency of the amplifier input is moved from a nominal value to a higher frequency. This value may be programmable. The movement of the low-corner frequency is accomplished by increasing the gain of the transconductance feedback amplifier 520 used to maintain the amplifier's DC balance.

When fast mode 560 is enabled, the read-back baseline is restored at a faster rate. Fast mode compensation may be invoked automatically after detection or it can be invoked by the controller during a retry via a Fast-mode input 570.

Figure 6:
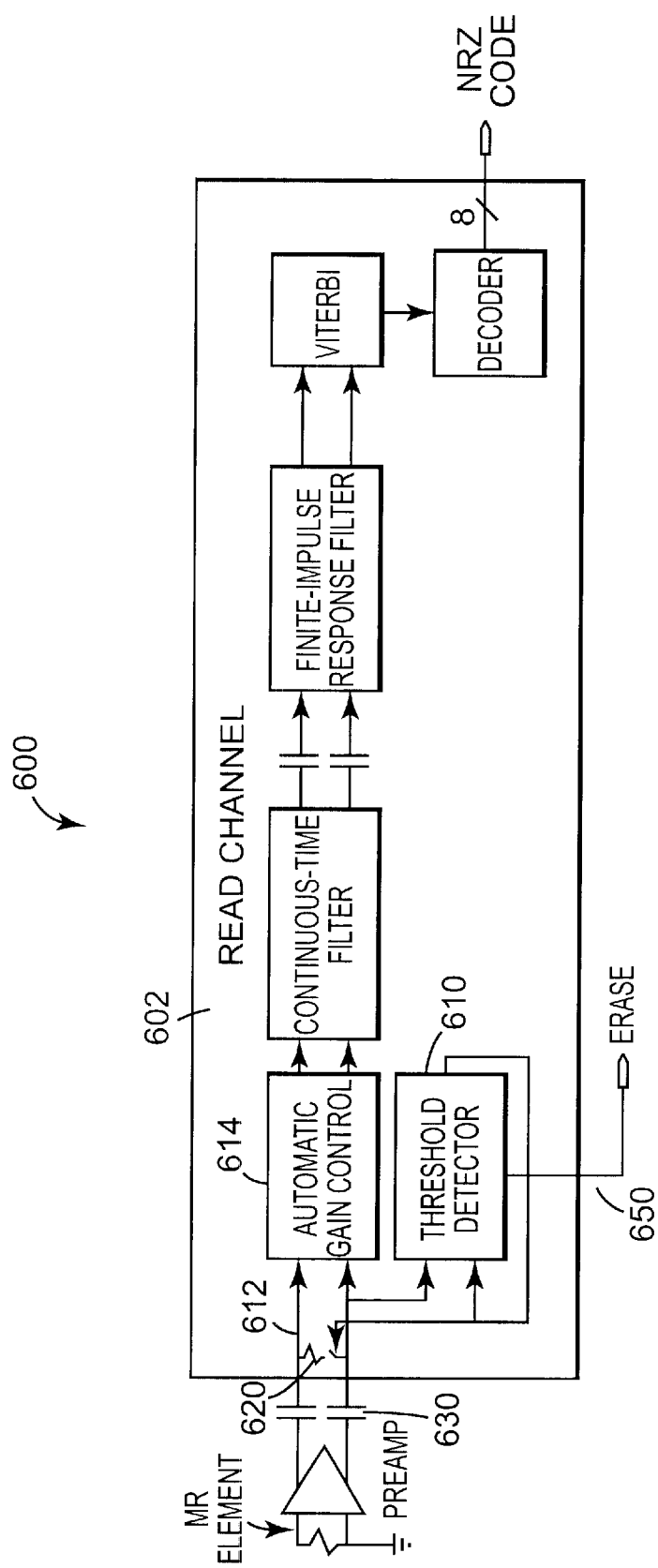
FIG. 6 illustrates a circuit for performing a fast recovery from a thermal asperity in a read channel.

FIG. 6 illustrates circuit 600 for performing a fast recovery from a thermal asperity in a read channel 602. In FIG. 6, a threshold detector 610 is connected in parallel with the input 612 to the automatic gain control (AGC) 614 in a partial response, maximum likelihood (PRML) channel 600. Upon detection of a thermal asperity event, the threshold detector 610 switches in a resistor 620 among the differential read signal inputs 612. These inputs 612 are capacitively coupled 630. The shunt resistor 620, in conjunction with the input capacitors 630, form a high pass filter. The baseline is then restored as dictated by the low-corner frequency.

Accordingly, the thermal asperity detection circuit 600 for read channels 602 as shown in FIG. 6 works much like that used in preamplifiers. Generally, a thermal asperity threshold is set outside the normal dynamic data range. However, in addition to a fault flag, the channel may generate an erasure pointer 650. This signal 650 indicates the portion of the read data stream that may have been corrupted by the thermal asperity event. Unlike the fault signal generated by the preamplifier, the channel's signal needs to be synchronized to that of the data detection path. The erasure pointer 650 can be used as part of the procedure for handling thermal asperity events.

Figure 7:
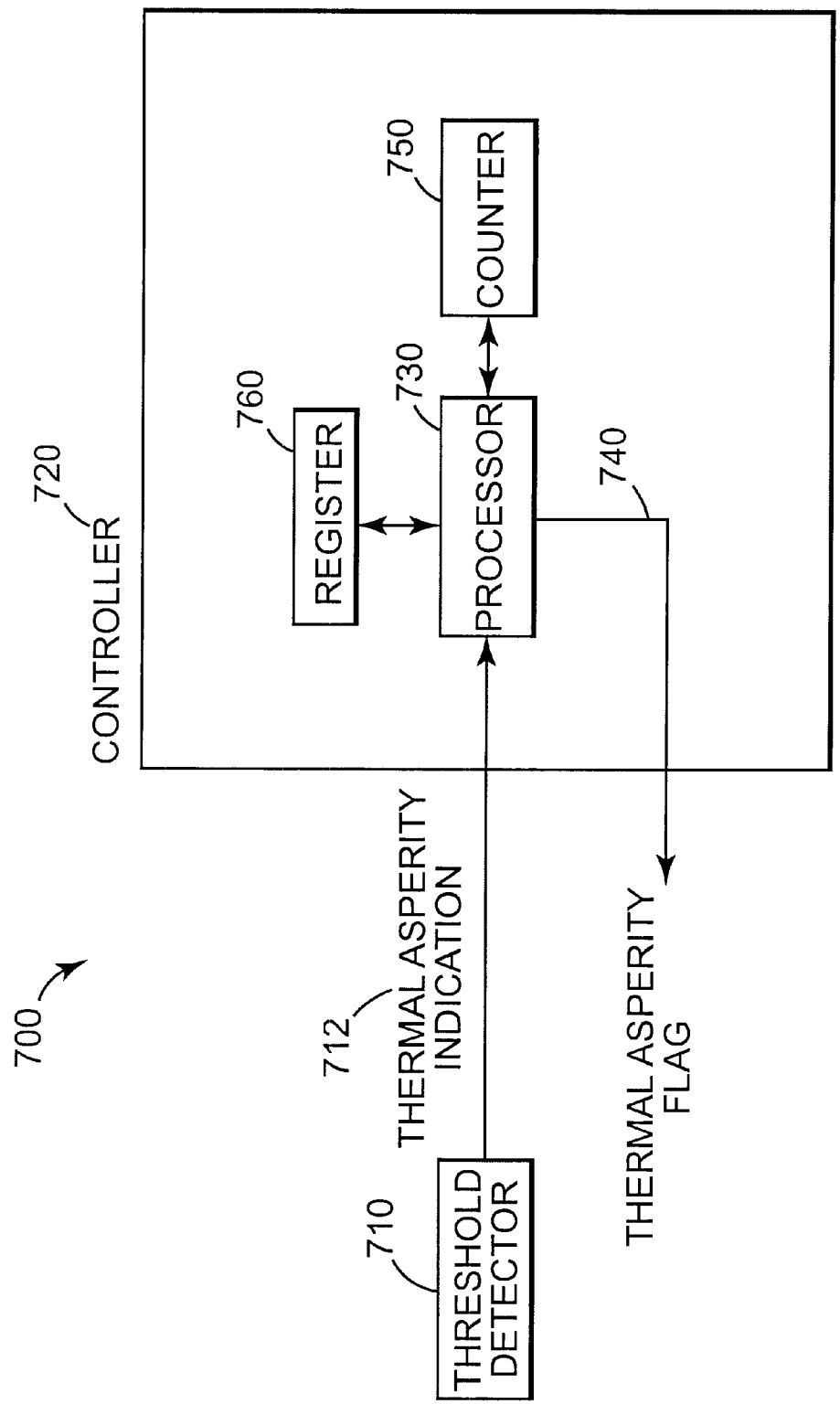
FIG. 7 illustrates a circuit that detects, records and provides error recover for multiple thermal asperities in a single sector.

Still, the above methods do not prevent hard error events when there are multiple thermal asperities in a single sector. FIG. 7 illustrates a circuit 700 that detects, records and provides error recover for multiple thermal asperities in a single sector. A threshold detector 710 is used to generate a signal 712 that is sent to the controller 720. Those skilled in the art will recognize that the invention is not meant to be limited to any single location, but rather the controller may be disposed in the channel 125 or control unit 129 as illustrated in FIG. 1.

A processor 730 is configured or programmed to processes the thermal asperity signal 712. The processor 730 sets a thermal asperity detected flag 740. A counter 750 in the controller counts the number of thermal asperity events as indicated by the thermal asperity detected flag 740. The counter 750 may be reset after each sector so that a count of the number of thermal asperity events occurring in a sector may be monitored. A register 760 is used to record the location of each of the flagged thermal asperity events in the current sector.

For example, in a 512 byte sector format, a 64 byte register 760 will give a complete picture of the thermal asperity events occurring in the sector, i.e., one predetermined bit in the 64 byte register 760 is set for each byte in the 512 byte sector that experiences a thermal asperity event. Those skilled in the art will recognize that even if a thermal asperity event is more than a byte wide, then a 64 byte register has 512 bits will suffice to indicate the location and number of the detected thermal asperity events. The bits in register 760 are reset between sectors. By identifying the location of each thermal asperity event, the corrupted data will be more likely recovered by the erasure error correction coding. Further, file error logs can reflect a more accurate picture of the thermal asperity event, and a drive's predictive failure analysis can use the log information to detect impending problems when the thermal asperity count starts to climb, e.g., from debris buildup, pressure/temperature change, and take appropriate actions.

Figure 8:
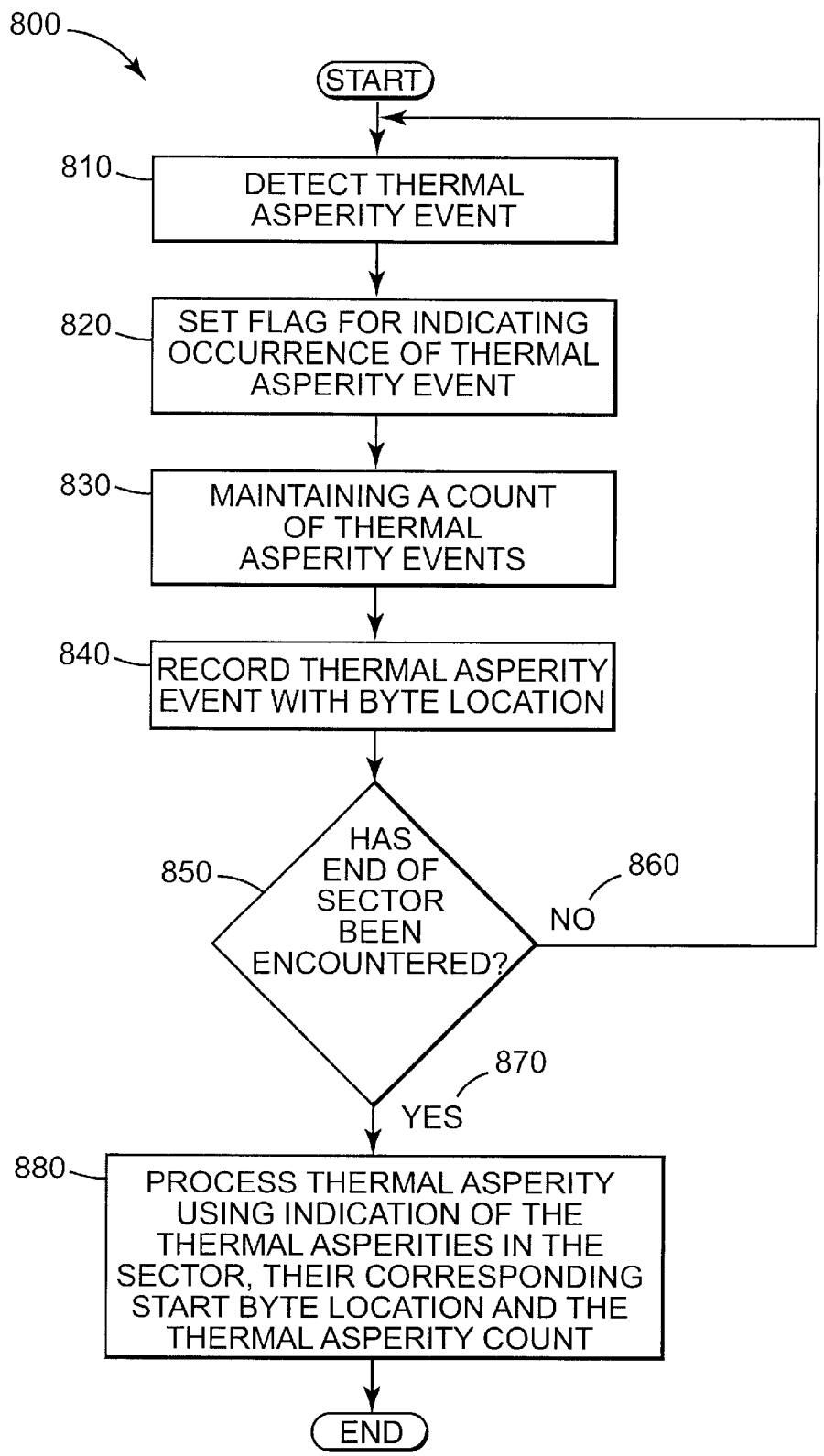
FIG. 8 is a flow chart of the method for compensating for multiple thermal asperity events in a sector according to the present invention.

FIG. 8 is a flow chart 800 of the method for compensating for multiple thermal asperity events in a sector according to the present invention. First, each thermal asperity event in a sector is detected 810. Then a flag is set indicating the occurrence of the thermal asperity event 820. A counter for maintaining a count of the thermal asperity events is incremented 830. Each thermal asperity event is recorded with a byte location 840. Next, a determination is made as to whether the end of a sector has been reached 850. If not 860, the process recycles to detect and record any additional thermal asperity events. Otherwise 870, the thermal asperity event is processed using the indication of the thermal asperities in the sector, their corresponding location and the thermal asperity count 880.

Those skilled in the art will recognize that setting a bit high in the 64 byte register 760 as illustrated in FIG. 7 may be used as a flag and as an indication of the start byte for the thermal asperity. The number of bits that are set high represents the number of the byte in the sector that experienced a thermal asperity event.

The information on the number and location of the thermal asperities in the sector is made available to the ECC unit or function in the controller to enhance the error correction and detection power. The information on the thermal asperities is not meant to replace prior art ECC techniques, but rather to be be used in addition to those techniques. The additional information provided by the invention is compatible with a variety of prior art ECC techniques, but the details of the ECC system are beyond the scope of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for processing asperity events in a sector of a storage device, comprising:
   detecting thermal asperity events while reading a sector;
   setting a flag indicating occurrence of a thermal asperity event in the sector;
   maintaining a count of the thermal asperity events in the sector; and
   recording a byte location for each of the thermal asperity events in the sector.

2. The method of claim 1 further comprising performing a data recovery procedure in response to the thermal asperity event.

3. The method of claim 2 wherein the data recovery procedure is performed using the flag setting and a location corresponding to the thermal asperity event.

4. The method of claim 3 wherein the data recovery procedure is further performed using the count of the thermal asperity events.

5. The method of claim 1 wherein the setting of a flag comprises setting a bit in a register.

6. The method of claim 1 wherein the recording further comprises setting a selected bit in a register, the selected bit's position in the register being determined by the location of the thermal asperity.

7. The method of claim 6 wherein the maintaining a count of the thermal asperity events in the Sector comprises the setting of a bit in the register for each thermal asperity event, the count being equal to a number of bits set in the register.

8. The method of claim 1 wherein the recording of the location for the thermal asperity event in the sector comprises setting a bit In a register, the bit being associated with the asperity event.

9. The method of claim 1 wherein the maintaining a count of the thermal asperity events In the sector comprises setting a bit in a register for each thermal asperity event, the count being equal to a number of bits set in the register.

10. A controller for processing multiple asperity events in a sector of a storage device, comprising:
    a processor for receiving information of thermal asperity events in a sector and for recording a byte location for each of the thermal asperity events in the sector; and
    a register for storing an indication representing each occurrence of a thermal asperity event in the sector.

11. The controller of claim 10 further comprising a counter for maintaining a count of the thermal asperity events in the sector.

12. The controller of claim 10 wherein the processor sets a flag indicating each occurrence of a thermal asperity event in a sector.

13. The controller of claim 12 wherein the processor initiates a data recovery procedure in response to the thermal asperity events.

14. The controller of claim 13 wherein the data recovery procedure is performed using the indication corresponding to the thermal asperity events.

15. The controller of claim 14 wherein the data recovery procedure Is further:performed using a count of the thermal asperity events.

16. The controller of claim 10 wherein the indication comprises a bit being set in the register.

17. The controller of claim 16 wherein the bits set in the register indicate a start byte location for thermal asperity events.

18. The controller of claim 17 wherein a count of the thermal asperity events in the sector is represented by the bits set in the register for each thermal asperity event, the count being equal to a number of bits set in the register.

19. The controller of claim 17 wherein each bit set in the register identifies a location of the thermal asperity events in the sector.

20. A disk drive, comprising;
    a storage medium comprising sectors of recorded data;
    a magneto-resistive head;
    a motor for moving the storage medium relative to the magneto-resistive head; and
    a control unit, the control unit controlling the motor and the position of the magnetic head relative to the data storage medium; and
    a controller for processing asperity events in a sector of the storage medium, the controller comprising:
       a processor for receiving information of thermal asperity events occurring while reading a sector and for recording a byte location for each of the thermal asperity events; and
       a register for storing an indication representing each occurrence of a thermal asperity event.

21. The disk drive of claim 20 further comprising a counter for maintaining a count of the thermal asperity events.

22. The disk drive of claim 20 wherein the processor sets a flag indicating each occurrence of a thermal asperity event.

23. The disk drive of claim 22 wherein the processor initiates a data recovery procedure using the indications of at least two thermal asperity events.

24. The disk drive of claim 23 wherein the data recovery procedure is performed using the flag settings and a location corresponding to the thermal asperity events.

25. The disk drive of claim 24 wherein the data recovery procedure is further performed using a count of the thermal asperity events.

26. The disk drive of claim 20 wherein the indication comprises a bit being set in the register.

27. The disk drive of claim 26 wherein the bits set in the register indicate a start byte location for thermal asperity events.

28. The disk drive of claim 27 wherein a count of the thermal asperity events in the sector is represented by the bits set in the register for each thermal asperity event, the count being equal to a number of bits set in the register.

29. The disk drive of claim 27 wherein each bit set in the register identifies a location of the thermal asperity events in the sector.

30. The disk drive of claim 20 wherein the magneto-resistive head comprises a anisotropic magneto-resistive sensor.

31. The disk drive of claim 20 wherein the magneto-resistive head comprises a spin valve sensor.

32. The disk drive of claim 20 wherein the register contains at least one bit corresponding to each byte in a sector.

* * * * *